US008810739B2

(12) United States Patent
Terao (10) Patent No.: US 8,810,739 B2
(45) Date of Patent: Aug. 19, 2014

(54) PROJECTION TYPE DISPLAY APPARATUS AND OPTICAL UNIT

(75) Inventor: Koichi Terao, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 94 days.

(21) Appl. No.: 13/478,549

(22) Filed: May 23, 2012

(65) Prior Publication Data

US 2012/0307166 A1 Dec. 6, 2012

(30) Foreign Application Priority Data

Jun. 6, 2011 (JP) ................................. 2011-126155
Feb. 23, 2012 (JP) ................................. 2012-037107

(51) Int. Cl.
*G02F 1/1335* (2006.01)
*H04N 9/31* (2006.01)
*G03B 33/12* (2006.01)
*G03B 21/00* (2006.01)

(52) U.S. Cl.
CPC ............ *G02F 1/1335* (2013.01); *H04N 9/3105* (2013.01); *G02F 2201/086* (2013.01); *G02F 1/133621* (2013.01); *G03B 33/12* (2013.01); *G03B 21/006* (2013.01)
USPC ............................................................ 349/5

(58) Field of Classification Search
USPC ............................................................ 349/5
See application file for complete search history.

(56) References Cited

U.S. PATENT DOCUMENTS

2005/0231662 A1* 10/2005 Isozaki et al. ................. 349/113
2009/0135316 A1* 5/2009 Horikoshi ......................... 349/5
2009/0268137 A1* 10/2009 Shutou et al. ................. 349/118
2010/0025642 A1* 2/2010 Hanaki et al. ................. 252/588
2010/0053527 A1* 3/2010 Hsieh et al. .................... 349/124

FOREIGN PATENT DOCUMENTS

| JP | 2000-169850 A | 6/2000 |
|---|---|---|
| JP | 2001-42334 A | 2/2001 |
| JP | 2001-272645 A | 10/2001 |
| JP | 2002-90528 A | 3/2002 |
| JP | 2003-149731 A | 5/2003 |
| JP | 2004-317948 A | 11/2004 |
| JP | 2005-326871 A | 11/2005 |
| JP | 2006-330058 A | 12/2006 |
| JP | 2007-264245 A | 10/2007 |
| JP | 2008-107508 A | 5/2008 |
| JP | 2008-150452 A | 7/2008 |
| JP | 2009-31545 A | 2/2009 |

* cited by examiner

*Primary Examiner* — Bumsuk Won
*Assistant Examiner* — Edmond Lau
(74) *Attorney, Agent, or Firm* — ALG Intellectual Property, LLC (57) ABSTRACT

In a blue-color liquid crystal panel out of a plurality of liquid crystal panels used in a projection type display apparatus, an integral value obtained by integrating absorbance of the liquid crystal layer thereof in a wavelength range from 300 nm to 350 nm is smaller in comparison with those of the other liquid crystal panels (a red-color liquid crystal panel and a green-color liquid crystal panel). In addition, the absorption end on the long wavelength side of the liquid crystal layer of the blue-color liquid crystal panel is positioned on the short wavelength side in comparison with the liquid crystal layers of the red-color liquid crystal panel and the green-color liquid crystal panel.

7 Claims, 3 Drawing Sheets

PROJECTION TYPE DISPLAY APPARATUS AND OPTICAL UNIT

BACKGROUND

1. Technical Field

The present invention relates to projection type display apparatuses equipped with a plurality of liquid crystal panels and optical units.

2. Related Art

In a projection type display apparatus including a plurality of liquid crystal panels as light valves, a beam of light emitted from a light source is modulated by the plurality of liquid crystal panels, thereafter the modulated beams of light are combined and projected onto a projection target such as a screen by a projection optical system. A red-color liquid crystal panel to which a beam of red light is supplied, a green-color liquid crystal panel to which a beam of green light is supplied and a blue-color liquid crystal panel to which a beam of blue light is supplied are frequently used as the liquid crystal panels. In such projection type display apparatus, since a beam of light having a shorter wavelength is supplied to the blue-color liquid crystal panel in comparison with the other crystal panels, its crystal layer is likely to be deteriorated.

Regarding a blue-color liquid crystal panel, there has been proposed a technique that lengthens the lifetime of a blue-color crystal panel by making the structure of the blue-color crystal panel differ from the structures of the other crystal panels (green-color and red-color liquid crystal panels) (see JP-A-2009-31545). In JP-A-2009-31545, it is proposed to make the size of a blue-color liquid crystal panel larger than the size of the other liquid crystal panels (green-color and red-color liquid crystal panels), for example.

However, in the case where the size of the blue-color liquid crystal panel is made larger than the size of the other liquid crystal panels (green-color and red-color liquid crystal panels) as in a configuration example described in JP-A-2009-31545, there arises an unfavorable problem in that requirements to largely change the design of a first substrate and a second substrate, manufacturing process and the like must be satisfied.

Hereinafter in this application, the inventors of the invention propose a technique that enhances light resistance of a blue-color liquid crystal panel by improving the ultraviolet absorption spectrum of a material itself used in the liquid crystal layer of the blue-color liquid crystal panel. With the configuration in the proposal, an advantage is achieved such that the design of the first and the second substrates, manufacturing process and the like are not required to be changed.

In JP-A-2009-31545, it is proposed to lower the concentration of a terphenyl derivative in the liquid crystal layer of the blue-color liquid crystal panel in comparison with the other liquid crystal panels (green-color and red-color liquid crystal panels). However, such configuration is intended to reduce the content of the terphenyl derivative, which causes decrease in light resistance, in the blue-color liquid crystal panel, and is different from the configuration proposed by the inventor in this application by which the ultraviolet absorption spectrum is improved. Further in JP-A-2009-31545, it is proposed to add an ultraviolet absorbing agent to the liquid crystal layer of the blue-color liquid crystal panel and not to add an ultraviolet absorbing agent to the liquid crystal layers of the other liquid crystal panels (green-color and red-color liquid crystal panels). However, even if the ultraviolet absorbing agent is added, it is difficult to sufficiently enhance the light resistance of the blue-color liquid crystal panel because it is difficult for the liquid crystal layer to avoid the receiving of a beam of light before the ultraviolet absorbing agent absorbs the beam of light. Furthermore, the ultraviolet absorbing agent can possibly change an orientation characteristic and the like of the liquid crystal layer.

SUMMARY

An advantage of some aspects of the invention is to provide a projection type display apparatus and an optical unit that can enhance light resistance of a liquid crystal panel for a short wavelength region by improving the ultraviolet absorption spectrum of a material itself that is used in the liquid crystal layer of the liquid crystal panel for a short wavelength region.

In order to achieve the above-mentioned advantage, a projection type display apparatus according to an aspect of the invention includes: a light source; a plurality of liquid crystal panels to each of which a beam of light of a different wavelength region is supplied from the light source; a light-combining optical system that combines beams of light emitted from the plurality of liquid crystal panels and emits the combined beam of light; and a projection optical system that projects the beam of light combined by the light-combining optical system. In a liquid crystal panel for a short wavelength region to which a beam of light of the shortest wavelength region is supplied among the plurality of liquid crystal panels, an integral value obtained by integrating absorbance of a liquid crystal layer in a wavelength range from 300 nm to 350 nm is smaller than those in any other liquid crystal panels.

According to the aspect of the invention, in the liquid crystal panel for a short wavelength region among the plurality of liquid crystal panels, an integral value obtained by integrating absorbance of the liquid crystal layer in a wavelength range from 300 nm to 350 nm is smaller than those in any other liquid crystal panels. That is to say, the light transmission rate of the liquid crystal panel for a short wavelength region is larger in comparison with those of the other liquid crystal panels when a beam of light of short wavelength region is incident. Accordingly, although excitation in a material used in the liquid crystal layer is smaller even if a beam of light of short wavelength region is incident in comparison with the other liquid crystal panels, deterioration of the liquid crystal panel for a short wavelength region is unlikely to occur. Therefore, it can be said that light resistance of the liquid crystal panel for a short wavelength region is superior to that of the other liquid crystal panels. On the other hand, since beams of light that enter the other liquid crystal panels have a longer wavelength than the beam of light that enters the liquid crystal panel for a short wavelength region, the liquid crystal layers of the other crystal panels are unlikely to be deteriorated. Therefore, in the projection type display apparatus according to the aspect of the invention, deterioration of a liquid crystal layer is unlikely to occur in any of the liquid crystal panels, thereby making it possible for the apparatus to project and display images with high quality for a longer period of time.

According to the aspect of the invention, in the liquid crystal panel for a short wavelength region, it is preferable that the absorption end on the long wavelength side of an ultraviolet absorption spectrum of the liquid crystal layer be positioned on the short wavelength side in comparison with the other liquid crystal panels. With this configuration, the light resistance of a liquid crystal panel for a short wavelength region can be further enhanced. Accordingly, deterioration of a liquid crystal layer is unlikely to occur in any of the liquid crystal panels in the projection type display apparatus according to the aspect of the invention, thereby making it possible for the apparatus to project and display images with high quality for a longer period of time.

A projection type display apparatus according to another aspect of the invention includes: a light source; a plurality of liquid crystal panels to each of which a beam of light of a different wavelength region is supplied from the light source; a light-combining optical system that combines beams of light emitted from the plurality of liquid crystal panels and emits the combined beam of light; and a projection optical system that projects the beam of light combined by the light-combining optical system. In a liquid crystal panel for a short wavelength region to which the beam of light of the shortest wavelength region is supplied among the plurality of liquid crystal panels, it is preferable that the absorption end on the long wavelength side of an ultraviolet absorption spectrum of the liquid crystal layer be positioned on the short wavelength side in comparison with the other liquid crystal panels.

According to the aspect of the invention, in a liquid crystal panel for a short wavelength region among the plurality of liquid crystal panels, the absorption end on the long wavelength side of an ultraviolet absorption spectrum of the liquid crystal layer is positioned on the short wavelength side in comparison with the other liquid crystal panels. In other words, in the liquid crystal panel for a short wavelength region, the light transmission range extends to the short wavelength side when a beam of light of short wavelength region is incident. Accordingly, in the liquid crystal panel for a short wavelength region, although excitation in a material used in the liquid crystal layer is smaller even if a light beam of short wavelength region enters in comparison with the other liquid crystal panels, deterioration of the liquid crystal panel is unlikely to occur. Therefore, it can be said that light resistance of the liquid crystal panel for a short wavelength region is superior to that of the other liquid crystal panels. On the other hand, since the beams of light that enter the other liquid crystal panels have a longer wavelength than the beam of light that enters the liquid crystal panel for a short wavelength region, the liquid crystal layers of the other crystal panels are unlikely to be deteriorated. Therefore, in the projection type display apparatus according to the aspect of the invention, deterioration of the liquid crystal layer is unlikely to occur in any of the liquid crystal panels, thereby making it possible for the apparatus to project and display images with high quality for a longer period of time.

In the projection type display apparatus according to the aspect of the invention, it is preferable that refraction index anisotropy of the liquid crystal layer be smaller in the liquid crystal panel for a short wavelength region than in the other liquid crystal panels. With this configuration, light resistance of the liquid crystal panel for a short wavelength region can be further enhanced, thereby making it possible for the projection type display apparatus according to the aspect of the invention to project and display images with high quality for a longer period of time.

In the projection type display apparatus according to the aspect of the invention, it is preferable that the plurality of liquid crystal panels include two or more liquid crystal panels serving as the other liquid crystal panels in which the same liquid crystal material is used in the liquid crystal layers thereof, and a liquid crystal material different from the liquid crystal material used in the other liquid crystal panels be used in the liquid crystal layer of the liquid crystal panel for a short wavelength region. With this configuration, the same crystal panel can be used as the other liquid crystal panels, thereby making it possible to simplify the configuration.

In the projection type display apparatus according to the aspect of the invention, it is preferable that the plurality of liquid crystal panels include a red-color liquid crystal panel to which a beam of red light is supplied, a green-color liquid crystal panel to which a beam of green light is supplied, and a blue-color liquid crystal panel to which a beam of blue light is supplied, and a configuration in which the blue-color liquid crystal panel is the liquid crystal panel for a short wavelength region whereas the red-color liquid crystal panel and the green-color liquid crystal panel are the other liquid crystal panels be employed.

Note that the invention can be applied to an optical unit that includes liquid crystal panels and a light-combining optical system. That is to say, an optical system according to an aspect of the invention includes: a plurality of liquid crystal panels to each of which a beam of light of a different wavelength region is supplied; and a light-combining optical system that combines beams of light emitted from the plurality of liquid crystal panels and emits the combined beam of light. Further, in a liquid crystal panel for a short wavelength region to which a beam of light of the shortest wavelength region is supplied among the plurality of liquid crystal panels, it is preferable that an integral value obtained by integrating absorbance of the liquid crystal layer in a wavelength range from 300 nm to 350 nm be smaller than those in any other liquid crystal panels.

An optical unit according to still another aspect of the invention includes: a plurality of liquid crystal panels to each of which a beam of light of a different wavelength region is supplied; and a light-combining optical system that combines beams of light emitted from the plurality of liquid crystal panels and emits the combined beam of light. Further, in a liquid crystal panel for a short wavelength region to which a beam of light of the shortest wavelength region is supplied among the plurality of liquid crystal panels, it is preferable that the absorption end on the long wavelength side of an ultraviolet absorption spectrum of the liquid crystal layer be positioned on the short wavelength side in comparison with the other liquid crystal panels.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described hereinafter with reference to the drawings. It is to be noted that in the drawings referred to in the following description, scales of layers, members and the like are individually changed so that such layers, members and the like have a size recognizable in the drawings.

As a plurality of liquid crystal panels to each of which a beam of light of a different wavelength region is supplied, liquid crystal panels on which a beam of red light, a beam of green light and a beam of blue light respectively are incident will be described below. Accordingly, in the following description, a liquid crystal panel for a short wavelength region to which a beam of light of the shortest wavelength region is supplied is a blue-color liquid crystal panel, while the other liquid crystal panels are a red-color liquid crystal panel and a green-color liquid crystal panel. Here, the wavelength regions to which a beam of red light, a beam of green light and a beam of blue light correspond are 620 to 740 nm, 500 to 570 nm, and 430 to 500 nm respectively. Note that in the following description, when a common configuration or the like of the liquid crystal panel is explained, the liquid crystal panel is mentioned as a liquid crystal panel 100, and when individual configurations of the plurality of liquid crystal panels 100 are explained, the liquid crystal panels are mentioned as follows.

A red-color liquid crystal panel 100R
A green-color liquid crystal panel 100G
A blue-color liquid crystal panel 100B That is, in accordance with a wavelength region of a beam of light to be modulated, R (red color), G (green color) or B (blue color) is added to the reference numeral 100 in the explanation.

Configuration Example of Projection Type Display Apparatus and Optical Unit

Figure 1A:
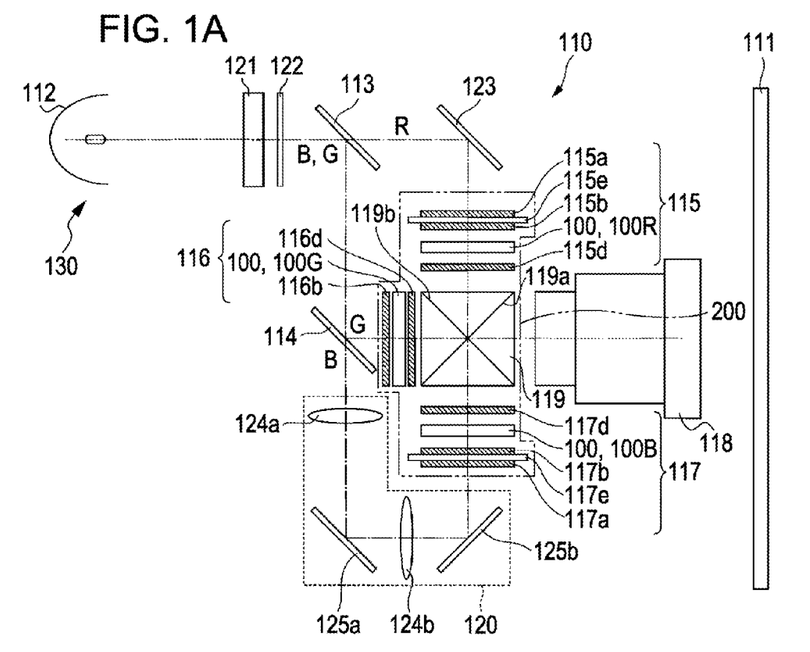
FIGS. 1A and 1B are diagrams each schematically illustrating the configuration of a projection type display apparatus and an optical unit according to an aspect of the invention.
Figure 1B:
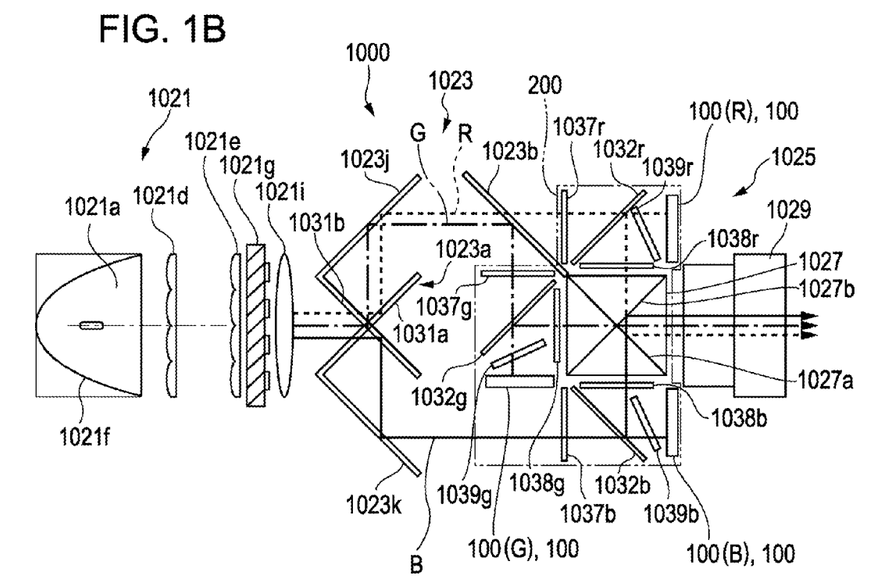

FIGS. 1A and 1B are diagrams each schematically illustrating the configuration of a projection type display apparatus and an optical unit according to an aspect of the invention. To be more specific, FIG. 1A is a descriptive diagram illustrating a projection type display apparatus using a transmissive crystal device and FIG. 1B is a descriptive diagram illustrating a projection type display apparatus using a reflective liquid crystal device.

A projection type display apparatus 110 as shown in FIG. 1A is an example in which a transmissive liquid crystal panel is employed as a liquid crystal panel, whereas a projection type display apparatus 1000 as shown FIG. 1B is an example in which a reflective liquid crystal panel is employed as a liquid crystal panel. However, as described below, the projection type display apparatuses 110 and 1000 respectively include light source units 130 and 1021, a plurality of liquid crystal panels 100 to each of which a beam of light of a different wavelength region is supplied from the light source units 130 and 1021, cross dichroic prisms 119 and 1027 (light-combining optical systems) that combine and emit beams of light having been emitted from the plurality of liquid crystal panels, and projection optical systems 118 and 1029 that project the beam of light combined by the light-combining optical systems. Further, in the projection type display apparatuses 110 and 1000, optical units 200 including the liquid crystal panels 100 and the cross dichroic prisms 119 and 1027 (light-combining optical systems) are used respectively.

First Example of Projection Type Display Apparatus

The projection type display apparatus 110 as shown in FIG. 1A is a projection type display apparatus of so-called projection type in which a beam of light is irradiated onto a screen 111 provided on the side of a viewer and the viewer views the beam of light reflected by the screen 111. The projection type display apparatus 110 includes the light source unit 130 having a light source 112, dichroic mirrors 113 and 114, liquid crystal light valves 115 through 117, the projection optical system 118, the cross dichroic prism 119 (light-combining optical system), and a relay system 120.

The light source 112 is configured by an extra-high pressure mercury lamp that supplies beams of light including a beam of red light R, a beam of green light G and a beam of blue light B. The dichroic mirror 113 is so configured as to transmit a beam of red light R from the light source 112 and reflect a beam of green light G and a beam of blue light B. The dichroic mirror 114 is so configured as to transmit the beam of blue light B and reflect the beam of green light G from among the beam of green light G and the beam of blue light B having been reflected by the dichroic mirror 113. In this manner, the dichroic mirrors 113 and 114 configure a color-separation optical system that separates a beam of light emitted from the light source 112 into a beam of red light R, a beam of green light G and a beam of blue light B.

Between the light source 112 and the dichroic mirror 113, an integrator 121 and a polarization converter 122 are disposed in this order from the light source 112. The integrator 121 is so configured as to uniform the illuminance distribution of a beam of light irradiated from the light source 112. Meanwhile, the polarization converter 122 is so configured as to convert a beam of light from the light source 112 to a beam of polarized light having a specific vibration direction such as a beam of s-polarized light.

The liquid crystal light valve 115 is a transmissive liquid crystal device that modulates a beam of red light R that has passed through the dichroic mirror 113 and reflected off a reflective mirror 123 based on an image signal. The liquid crystal light valve 115 includes a $\lambda/2$ phase difference plate 115a, a first polarization plate 115b, the liquid crystal panel 100 (red-color liquid crystal panel 100R) and a second polarization plate 115d. Note that the beam of red light R that enters the liquid crystal valve 115 remains s-polarized because polarization of the beam of light is not changed by passing through the dichroic mirror 113.

The $\lambda/2$ phase difference plate is an optical element that converts a beam of s-polarized light that has entered the liquid crystal light valve 115 to a beam of p-polarized light. The first polarization plate 115b is a polarization plate that blocks the beam of s-polarized light and transmits a beam of p-polarized light. The liquid crystal panel 100 (red-color liquid crystal panel 100R) is so configured as to convert a beam of p-polarized light to a beam of s-polarized light (beam of circularly-polarized or elliptically-polarized light for halftone) by modulation based on an image signal. Furthermore, the second polarization plate 115d is a polarization plate that blocks a beam of p-polarized light and transmits a beam of s-polarized light. Accordingly, the liquid crystal light valve 115 is so configured as to modulate a beam of red light R based on the image signal and emit the modulated beam of red light R toward the cross dichroic prism 119.

It is to be noted that both the $\lambda/2$ phase difference plate 115a and the first polarization plate 115b are disposed being in contact with a light transmissive glass plate 115e that is made not to change any polarization, thereby making it possible for the $\lambda/2$ phase difference plate 115a and the first polarization plate 115b to avoid being deformed due to generated heat.

The liquid crystal light valve 116 is a transmissive liquid crystal device that modulates a beam of green light G which has reflected off the dichroic mirror 113 and then reflected off the dichroic mirror 114 based on an image signal. This liquid crystal light valve 116, as does the liquid crystal valve 115, includes a first polarization plate 116b, the liquid crystal panel 100 (green-color liquid crystal panel 100G) and a second polarization plate 116d. A beam of green light G that enters the liquid crystal light valve 116 is a beam of s-polarized light having been reflected by the dichroic mirrors 113 and 114. The first polarization plate 116b is a polarization plate that blocks a beam of p-polarized light and transmits a beam of s-polarized light. The liquid crystal panel 100 (green-color liquid crystal panel 100B) is so configured as to convert the beam of s-polarized light to the beam of p-polarized light (beam of circularly-polarized or elliptically-polarized light for halftone) by modulation based on an image signal. Furthermore, the second polarization plate 116d is a polarization plate that blocks the beam of s-polarized light and transmits a beam of p-polarized light. Accordingly, the liquid crystal light valve 116 is so configured as to modulate a beam of green light G based on the image signal and emit the modulated beam of green light G toward the cross dichroic prism 119.

The liquid crystal light valve 117 is a transmissive liquid crystal device that modulates a beam of blue light B which has reflected off the dichroic mirror 113, and has passed through the dichroic mirror 114, then has experienced the relay system 120 based on an image signal. This liquid crystal light valve 117, as do the liquid crystal light valves 115 and 116, includes a $\lambda/2$ phase difference plate 117a, a first polarization plate 117b, the liquid crystal panel 100 (blue-color liquid crystal panel 100B) and a second polarization plate 117d. Because a beam of blue light B that enters the liquid crystal light valve 117 has reflected off the dichroic mirror 113, and has passed through the dichroic mirror 114, and thereafter has reflected off two reflective mirrors 125a and 125b which will be explained later in the relay system 120, the beam of light is s-polarized.

The $\lambda/2$ phase difference plate 117a is an optical element that converts a beam of s-polarized light having entered the liquid crystal light valve 117 to a beam of p-polarized light. The first polarization plate 117b is a polarization plate that blocks the beam of s-polarized light and transmits the beam of p-polarized light. The liquid crystal panel 100 (blue-color liquid crystal panel 100B) is so configured as to convert a beam of p-polarized light to a beam of s-polarized light (beam of circularly-polarized or elliptically-polarized light for halftone) by modulation based on an image signal. Furthermore, the second polarization plate 117d is a polarization plate that blocks a beam of p-polarized light and transmits a beam of s-polarized light. Accordingly, the liquid crystal light valve 117 is so configured as to modulate the beam of blue light B based on the image signal and emit the modulated beam of blue light B toward the cross dichroic prism 119. It is to be noted that the $\lambda/2$ phase difference plate 117a and the first polarization plate 117b are disposed being in contact with a glass plate 117e.

The relay system 120 includes relay lenses 124a, 124b and the reflective mirrors 125a, 125b. The relay lenses 124a and 124b are provided so as to prevent optical loss due to a light path of a beam of blue light B being longer. The relay lens 124a is disposed between the dichroic mirror 114 and the reflective mirror 125a. Meanwhile, the relay lens 124b is disposed between the reflective mirrors 125a and 125b. The reflective mirror 125a is so disposed as to reflect the beam of blue light B which has passed through the dichroic mirror 114 and has been emitted from the relay lens 124a toward the relay lens 124b. The reflective mirror 125b is so disposed as to reflect the beam of blue light B having been emitted from the relay lens 124b toward the liquid crystal light valve 117.

The cross dichroic prism 119 is a color-combining optical system in which two dichroic films 119a and 119b are disposed orthogonal to each other in an X-shaped manner. The dichroic film 119a is a film that reflects a beam of blue light B and transmits a beam of green light G. Meanwhile the dichroic film 119b is a film that reflects a beam of red light R and transmits a beam of green light G. Accordingly, the cross dichroic prism 119 is so configured as to combine a beam of red light R, a beam of green light G and a beam of blue light B having been modulated respectively by the liquid crystal light valves 115 through 117 and emit the combined beam of light toward the projection optical system 118.

It is to be noted that the beam of light that enters the cross dichroic prism 119 from the liquid crystal light valves 115 and 117 is a beam of s-polarized light, and the beam of light that enters the cross dichroic prism 119 from the liquid crystal light valve 116 is a beam of p-polarized light. By causing the beams of light that enter the cross dichroic prism 119 to be different kinds of beams of polarized light as described above, each beam of light entering from each of the liquid crystal light valves 115 through 17 can be combined together in the cross dichroic prism 119. In general, the dichroic films 119a and 119b have excellent reflection characteristics of s-polarization. Therefore, a beam of red light R and a beam of blue light B reflected by the dichroic films 119a and 119b are s-polarized, and a beam of green light G that passes through the dichroic films 119a and 119b is p-polarized. The projection optical system 118 has a projection lens (not shown) and is so configured as to project the beam of light combined by the cross dichroic prism 119 onto the screen 111.

Second Example of Projection Type Display Apparatus

The projection type display apparatus 1000 as shown in FIG. 1B includes the light source unit 1021 that generates a beam of source light, a color-separation light-guiding optical system 1023 that separates the beam of source light emitted from the light source unit 1021 into three color light components of the beam of red light R, the beam of green light G and the beam of blue light B, and a light modulator 1025 that is illuminated by individual color light components of the beam of source light emitted from the color-separation light-guiding optical system 1023. Further, the projection type display apparatus 1000 includes the cross dichroic prism 1027 (light-combining optical system) that combines optical images of individual color light beams emitted from the light modulator 1025, and the projection optical system 1029 that projects the optical image having experienced the cross dichroic prism 1027 onto a screen (not shown).

In this projection type display apparatus 1000, the light source unit 1021 includes a light source 1021a, a pair of fly-eye optical systems 1021d and 1021e, a polarization conversion member 1021g and a superposition lens 1021i. In this embodiment, the light source unit 1021 includes a reflector 1021f formed in a paraboloid and emits a beam of parallel light. The fly-eye optical systems 1021d and 1021e are each configured of a plurality of their component lenses arranged in matrix form in a plane orthogonal to the system optical axis; the beam of source light is divided, and individually collected and diffused by these component lenses. The polarization conversion member 1021g converts the beam of source light emitted from the fly-eye optical system 1021e only to a beam of p-polarized component light parallel to the drawing, for example, and supplies it to an optical system on the downstream side of the light path. The superposition lens 1021i makes it possible to illuminate each of the plurality of liquid crystal panels 100 provided in the light modulator 1025 evenly in a superposition manner by appropriately converging the beam of source light having passed through the polarization conversion member 1021g as a whole.

The color-separation light-guiding optical system 1023 includes a cross dichroic mirror 1023a, a dichroic mirror 1023b and reflective mirrors 1023j and 1023k. In the color-separation light-guiding optical system 1023, the beam of source light of approximately white from the light source unit 1021 enters the cross dichroic mirror 1023a. The beam of red light R having been reflected by a first dichroic mirror 1031a as one component configuring the cross dichroic mirror 1023a is reflected by the reflective mirror 1023j, passes through the dichroic mirror 1023b, and enters the liquid crystal panel 100 (red-color liquid crystal panel 100R) remaining p-polarized via an incident-side polarization plate 1037r, a wire grid polarization plate 1032r that transmits a beam of p-polarized light and reflects the beam of s-polarized light, and an optical compensating plate 1039r.

A beam of green light G having been reflected by the first dichroic mirror 1031a is reflected by the reflective mirror 1023j, thereafter also reflected by the dichroic mirror 1023b, and enters the liquid crystal panel 100 (green-color liquid crystal panel 100G) remaining p-polarized via an incident-side polarization plate 1037g, a wire grid polarization plate 1032g that transmits a beam of p-polarized light and reflects a beam of s-polarized light, and an optical compensating plate 1039g.

Meanwhile, a beam of blue light B having been reflected by a second dichroic mirror 1031b as the other component configuring the cross dichroic mirror 1023a is reflected by the reflective mirror 1023k, and enters the liquid crystal panel 100 (blue-color liquid crystal panel 100B) remaining p-polarized via an incident-side polarization plate 1037b, a wire grid polarization plate 1032b that transmits a beam of p-polarized light and reflects a beam of s-polarized light, and an optical compensating plate 1039b. The optical compensating plates 1039r, 1039g and 1039b optically compensate characteristics of the liquid crystal layers by adjusting the polarization states of the beams of incident light on the liquid crystal panels 100 and the beams of output light.

With the projection type display apparatus 1000 configured in this manner, three color beams of light having entered via the optical compensating plates 1039r, 1039g and 1039b are respectively modulated by the corresponding liquid crystal panels 100. In this case, out of the modulated beams of light emitted from the liquid crystal panels 100, a beam of s-polarized component light reflects off the wire grid polarization plates 1032r, 1032g and 1032b, and enters the cross dichroic prism 1027 via output-side polarization plates 1038r, 1038g, and 1038b. In the cross dichroic prism 1027, a first dielectric multilayer film 1027a and a second dielectric multilayer film 1027b are formed intersecting with each other in an X-shaped manner; the first dielectric multilayer film 1027a reflects a beam of red light R, while the second dielectric multilayer film 1027b reflects a beam of blue light B. Accordingly, the three color beams of light are combined in the cross dichroic prism 1027 and emitted to the projection optical system 1029. Then, the projection optical system 1029 projects a color optical image having been combined in the cross dichroic prism 1027 onto a screen (not shown) at a desired magnification.

Structure of Liquid Crystal Panel 100
Basic Structure of Liquid Crystal Panel 100

Figure 2A:
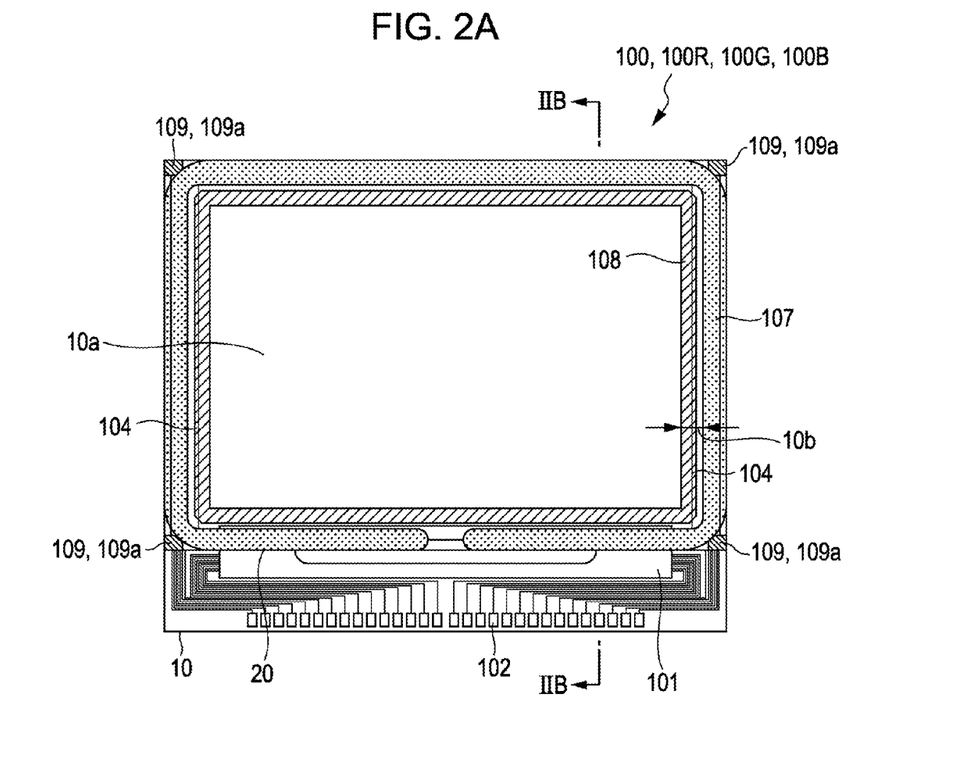
FIGS. 2A and 2B are descriptive diagrams illustrating a liquid crystal panel used in a projection type display apparatus and an optical unit according to an aspect of the invention.
Figure 2B:
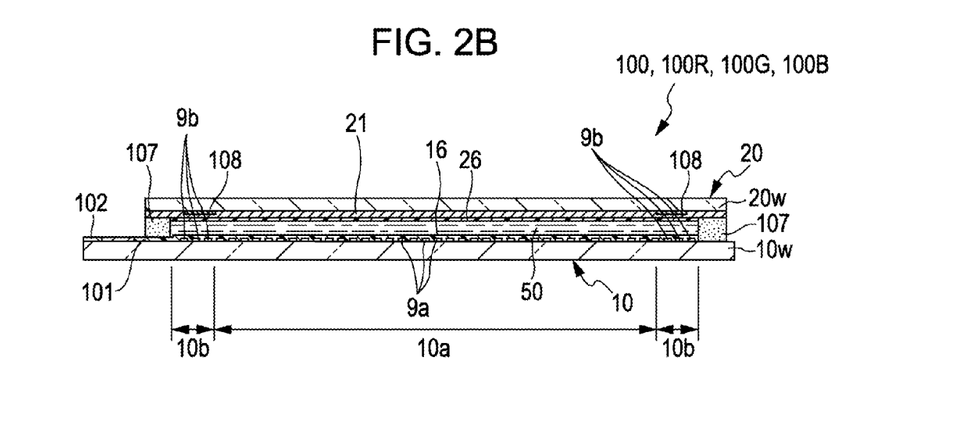

FIGS. 2A and 2B are descriptive diagrams illustrating a liquid crystal panel 100 used in the projection type display apparatuses 110, 1000 and the optical unit 200 according to the embodiment of the invention. FIG. 2A is a plan view of the liquid crystal panel 100 and its constituent elements when seen from the side of a second substrate explained later, and FIG. 2B is a cross-sectional view thereof taken along the line IIB-IIB in FIG. 2A.

As shown in FIG. 2A and FIG. 2B, in the liquid crystal panel 100 (red-color liquid crystal panel 100R, green-color liquid crystal panel 100G and blue-color liquid crystal panel B), a first substrate 10 and a second substrate 20 are bonded by a seal material 107 with a predetermined space therebetween, and the seal material 107 is provided in a frame-like shape along the outer border of the second substrate 20. This liquid crystal panel 100 is configured as a liquid crystal panel of TN (twisted nematic) mode, VA (vertical alignment) mode or the like. In the liquid crystal panel 100, the seal material 107 is an adhesive which is made of photo curable resin, thermosetting resin or the like, and gap materials such as glass fiber or glass beads are compounded therein so as to cause a distance between the two substrates to be a predetermined value. In the liquid crystal panel 100 configured as described above, a liquid crystal layer 50 is held in a region surrounded by the seal material 107 between the first substrate 10 and the second substrate 20.

In this embodiment, both the first substrate 10 and the second substrate 20 have a quadrangular shape, and a pixel region 10a is provided as a quadrangular region in approximately the center of the liquid crystal panel 100. In correspondence thereto, the seal material 107 is also provided in approximately quadrangular form, and a peripheral region 10b approximately quadrangular is provided in a frame-like shape between the inner border of the seal material 107 and the outer border of the pixel region 10a. In the first substrate 10, a data line driving circuit 101 and a plurality of terminals 102 are formed along a side of the first substrate 10 outside of the pixel region 10a; along another side adjacent to this side, a scanning line driving circuit 104 is formed. Note that a flexible wiring substrate (not shown) is connected to the terminals 102 and various values of potentials and various kinds of signals are input to the first substrate 10 via the flexible wiring substrate.

On one surface side of the first substrate 10, pixel transistors (not shown) and pixel electrodes 9a that are electrically connected to the pixel transistors are formed in matrix form in the pixel region 10a, and an oriented film 16 is formed on the upper layer side of the pixel electrodes 9a. The oriented film 16 is formed with a resin film of polyimide or the like, or with an oblique evaporation film of a silicon oxide film or the like. In this embodiment, the oriented film 16 is an inorganic oriented film (perpendicularly-oriented film) formed with an oblique evaporation film of $SiO_x$ (x<2), $SiO_2$, $TiO_2$, MgO, $Al_2O_3$, $In_2O_3$, $Sb_2O_3$, $Ta_2O_5$ or the like. On the one surface side of the first substrate 10, dummy pixel electrodes 9b are formed in the peripheral region 10b. The dummy pixel electrodes 9b and the pixel electrodes 9a are formed simultaneously. As a configuration of the dummy pixel electrodes 9b, one of a configuration in which the dummy pixel electrodes are electrically connected with dummy pixel transistors, a configuration in which the dummy pixel electrodes are electrically connected directly with a wiring circuit without providing dummy pixel transistors and a configuration in which the dummy pixel electrodes are in a float state without being applied a potential is employed. When a surface on which the oriented film 16 is formed is flattened through polishing in the first substrate 10, a positional difference in height between the pixel region 10a and the peripheral region 10b is reduced by these dummy pixel electrodes 9b so as to make the surface flat. Therefore, as described above, the dummy pixel electrodes 9b contribute to flattening the surface on which the oriented film 16 is formed. In addition, if the dummy pixel electrodes 9b are set to a predetermined potential, disarray in orientation of the liquid crystal molecules can be prevented at the outer end portion of the pixel region 10a.

In the second substrate 20, a common electrode 21 is formed on one surface side facing the first substrate 10, and an oriented film 26 is formed on the common electrode 21. The oriented film 26 is, same as the oriented film 16, formed with a resin film of polyimide or the like, or with an oblique evaporation film of a silicon oxide or the like. In this embodiment, the oriented film 26 is an inorganic oriented film (perpendicularly-oriented film) formed with an oblique evaporation film of $SiO_x$ (x<2), $SiO_2$, $TiO_2$, MgO, $Al_2O_3$, $In_2O_3$, $Sb_2O_3$, $Ta_2O_5$ or the like. These oriented films 16 and 26 allow the liquid crystal panel 100 to operate in a normally-black VA mode by causing a nematic liquid crystal compound, having negative dielectric anisotropy and used in the liquid crystal layer 50, to be perpendicularly oriented, for example. The common electrode 21 is formed substantially on the whole surface of the second substrate 20 or as a plurality of belt-like electrodes so as to cover across a plurality of pixels. Further, in the second substrate 20, on one surface side facing the first substrate 10, there is formed a light blocking layer 108 on the lower layer side of the common electrode 21. In this embodiment, the light blocking layer 108 is formed in a frame-like manner extending along the outer border of the pixel region 10*a* and functions as a bordering member. The outer border of the light blocking layer 108 is distanced from the inner border of the seal material 107 with a space therebetween; accordingly, the light blocking layer 108 and the seal material 107 are not overlapped each other. It is to be noted that the light blocking layer 108 is formed in a region or the like that overlaps with a region sandwiched by neighboring pixel electrodes 9*a* in some case in the second substrate 20.

In the liquid crystal panel 100 configured as described above, there are formed inter-substrate conducting electrodes 109 in the first substrate 10 so as to provide electrical conduction between the first substrate 10 and the second substrate 20 at the areas that overlap with corner potions of the second substrate 20 outside of the seal material 107. Inter-substrate conducting members 109*a* containing conductive particles are disposed on the inter-substrate conducting electrodes 109, and the common electrode 21 of the second substrate 20 is electrically connected to the first substrate 10 side via the inter-substrate conducting members 109*a* and inter-substrate conducting electrodes 109. Accordingly, a common potential is applied to the common electrode 21 from the first substrate 10 side.

The seal material 107 is provided along the outer border of the second substrate 20 approximately with the same width dimension. Therefore, the seal material 107 is approximately quadrangular. However, because the seal material 107 is provided so as to avoid the inter-substrate conducting electrodes 109 and pass by the inner side thereof at the areas where it overlaps with corner potions of the second substrate 20, corner potions of the seal material 107 are approximately arc-shaped.

With the liquid crystal panel 100 configured as described above, a transmissive liquid crystal panel 100 can be constructed if the pixel electrodes 9*a* and the common electrode 21 are formed with a light transmissive conduction film such as an ITO (indium tin oxide) film, an IZO (indium zinc oxide) film or the like. In the transmissive liquid crystal panel 100, a beam of light having entered from the side of the second substrate 20 is modulated while the beam of light passing through the first substrate 10 and being emitted. In contrast, a reflective liquid crystal panel 100 can be constructed if, out of the pixel electrodes 9*a* and the common electrode 21, the common electrode 21 is formed with a light transmissive conduction film and the pixel electrodes 9*a* are formed with a reflective conduction film such as an aluminum film or the like, for example. In the reflective liquid crystal panel 100, a light beam having entered from the side of the second substrate 20 is modulated while the light beam being reflected by the first substrate 10 and emitted.

In this embodiment, the liquid crystal panel 100 is used as a light valve in the projection type display apparatus having been described referring to FIG. 1. In this case, since each of the beams of color light enters each corresponding liquid crystal panel 100, color filters are not formed.

Description of Liquid Crystal Layer 50 of Liquid Crystal Panel 100

Figure 3A:
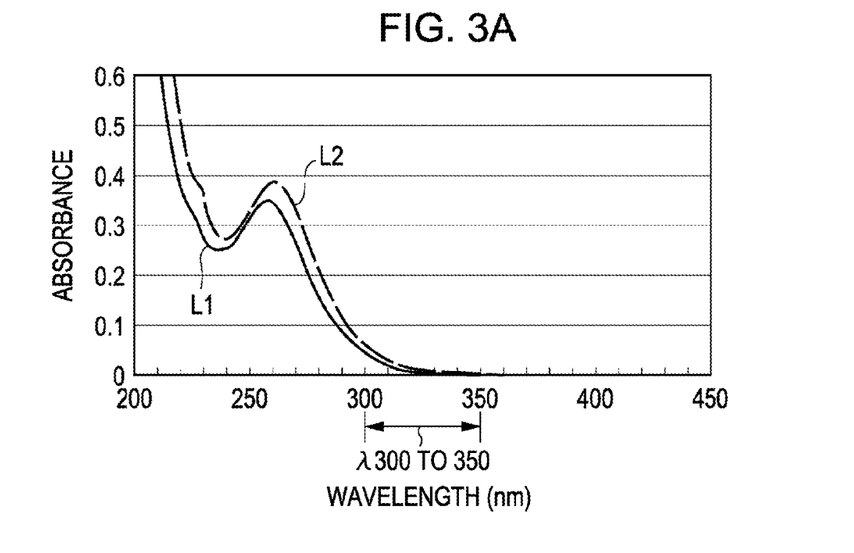
FIGS. 3A and 3B are descriptive charts indicating an ultraviolet (UV) absorption spectrum of the liquid crystal layer of a liquid crystal panel used in a projection type display apparatus according to an aspect of the invention.
Figure 3B:
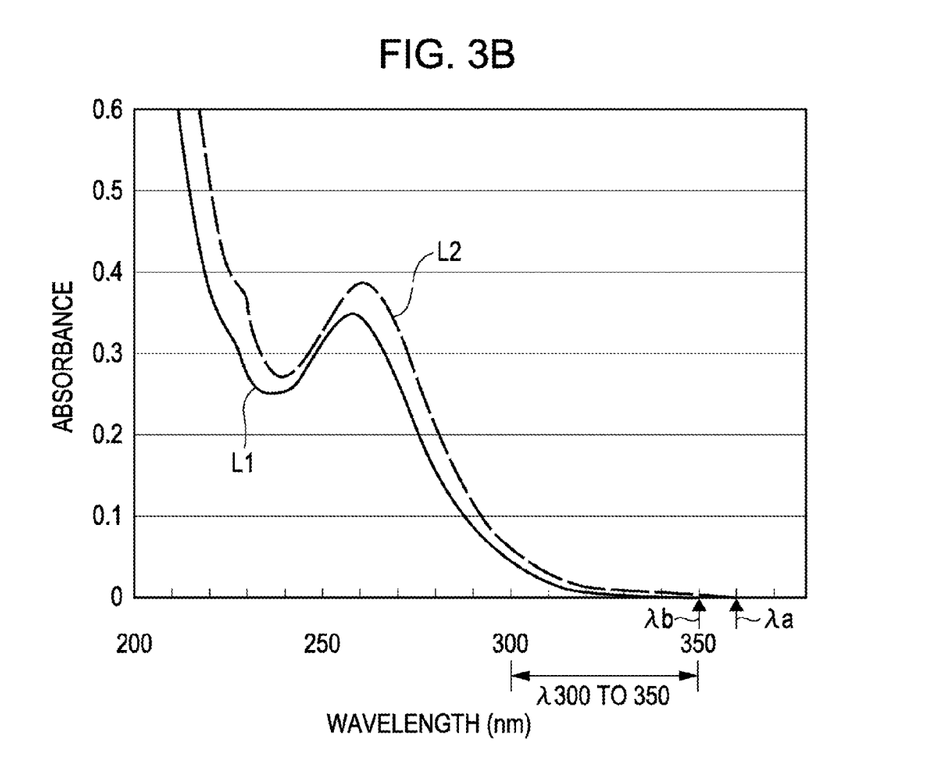

FIGS. 3A and 3B are descriptive charts indicating an ultraviolet (UV) absorption spectrum of the liquid crystal layer 50 of the liquid crystal panel 100 used in the projection type display apparatuses 110, 1000 according to the embodiment of the invention. FIG. 3A indicates a UV absorption spectrum from 200 nm to 450 nm, and a UV absorption spectrum from 200 nm to approximately 350 nm is enlarged and indicated in FIG. 3B. Note that the UV absorption spectra indicated in FIGS. 3A and 3B are measurement results under the condition that the liquid crystal material is caused to be an n-hexane solution (concentration of liquid crystal material=5 mg/L).

In the liquid crystal panel 100 as shown in FIGS. 2A and 2B, a liquid crystal material of biphenyl, a liquid crystal material of phenylcyclohexane, a liquid crystal material of cyclohexane, a liquid crystal material of phenyl pyrimidine, a liquid crystal material of ester, a liquid crystal material of dioxane and so on are used in the liquid crystal layer 50. Note that, in the liquid crystal layer 50, while a single liquid crystal material from among the above-mentioned materials is used, a plurality of liquid crystal materials are often blended and used in order to meet performance requirements related to a drop in driving voltage, heat resistance, viscosity and the like. On the other hand, in the case of the blue-color liquid crystal panel 100B out of the plurality of liquid crystal panels 100 used in the projection type display apparatuses 110 and 1000, a beam of light supplied thereto has a shorter wavelength than a beam of light supplied to the other liquid crystal panels (red-color liquid crystal panel R and green-color liquid crystal panel G); accordingly, the liquid crystal layer 50 of the blue-color liquid crystal panel B is likely to be deteriorated.

Considering the above situation, the liquid crystal layer 50 of the blue-color liquid crystal panel 100B, to which a beam of light of the shortest wavelength region is supplied among the plurality of liquid crystal panels 100, is configured by using a liquid crystal material that is more excellent in light resistance in comparison with the other liquid crystal panels (red-color liquid crystal panel 100R and green-color liquid crystal panel 100G) in this embodiment. More specifically, when liquid crystal materials to be used in the liquid crystal layer are selected from among a liquid crystal material of biphenyl, a liquid crystal material of phenylcyclohexane, a liquid crystal material of cyclohexane, a liquid crystal material of phenyl pyrimidine, a liquid crystal material of ester, a liquid crystal material of dioxane and so on and a blend ratio of the selected materials is determined, materials that are further unlikely to absorb a beam of light of short wavelength region are selected and used in the blue-color liquid crystal panel 100B in comparison with the red-color liquid crystal panel 100R and the green-color liquid crystal panel 100G. In contrast, when liquid crystal materials to be used in the red-color liquid crystal panel 100R and the green-color liquid crystal panel 100G are selected, higher priority is given to a drop in driving voltage, heat resistance, viscosity and the like than to light resistance, and the same liquid crystal materials are compounded at the same blend ratios in the liquid crystal layer 50 of the red-color liquid crystal panel 100R and the liquid crystal layer 50 of the green-color liquid crystal panel 100G.

For example, in this embodiment, a liquid crystal material having a UV absorption spectrum illustrated in a solid line L1 in FIGS. 3A and 3B is used in the liquid crystal layer 50 of the blue-color liquid crystal panel 100B, meanwhile a liquid crystal material having a UV absorption spectrum illustrated in a broken line L2 in FIGS. 3A and 3B is used in the liquid crystal layers 50 of the other liquid crystal panels (red-color liquid crystal panel 100R and green-color liquid crystal panel 100G).

Regarding the liquid crystal materials mentioned above, as can be understood by comparing two types of UV absorption spectra in FIGS. 3A and 3B, an integral value obtained by integrating absorbance $A_\lambda$ of the liquid crystal layer 50 of the blue-color liquid crystal panel 100B in a wavelength range $\lambda_{300\text{-}350}$ of 300 nm to 350 nm is smaller than the integral value of the liquid crystal layers 50 of the red-color liquid crystal panel 100R and the green-color liquid crystal panel 100G. Here, absorbance $A_\lambda$ of the liquid crystal layer 50 is expressed as $A_\lambda = -\log_{10} (I/I_o)$, where I is an intensity of a beam of transmitted light from the liquid crystal layer and $I_o$ is an intensity of a beam of incident light. In addition, integral value $S_\lambda$ obtained by integrating absorbance $A_\lambda$ of the liquid crystal layer 50 in a wavelength range $\lambda_{300\text{-}350}$ of 300 nm to 350 nm is expressed as described in Equation 1.

$$S_{\lambda 300\text{-}350\,nm} = \int_{300}^{350} A_\lambda \quad (1)$$

In a liquid crystal material used in the liquid crystal layer 50, a maximum absorption (absorption peak) which is on the longest wavelength side can be normally seen in a wavelength range approximately from 200 nm to 300 nm. In this embodiment, absorption in a range from 300 nm to 350 nm, which corresponds to the absorption peak of the absorption curve on the long wavelength side and monotonically decreases, has been taken into consideration. Absorption in a wavelength range of less than 300 nm is not adopted because it can have a spectrum that does not monotonically decrease in some case due to difference in a position of maximum absorption (absorption peak) of the liquid crystal material. Furthermore, absorbance $A_\lambda$ of the liquid crystal layer in a longer wavelength region, that is, in a wavelength range of more than 350 nm is not adopted as well because it comes close to a measurement detection limit of a spectrophotometer and causes a measurement error to be larger.

The absorption end on the long wavelength side of the liquid crystal layer 50 of the blue-color liquid crystal panel 100B is positioned on the short wavelength side in comparison with the liquid crystal layers 50 of the red-color liquid crystal panel 100R and green-color liquid crystal panel 100G. To be more specific, the absorption end $\lambda_b$ on the long wavelength side of the liquid crystal layer 50 of the blue-color liquid crystal panel 100B is 350 nm, whereas the absorption end $\lambda_a$ on the long wavelength side of the liquid crystal layers 50 of the other liquid crystal panels (red-color liquid crystal panel 100R and green-color liquid crystal panel 100G) is 360 nm.

The UV absorption spectrum indicates presence of a conjugate property of a material and the like. Accordingly, the above-mentioned configuration of the liquid crystal layer 50 of the blue-color liquid crystal panel 100B can be realized, for example, by employing a composition in which use of a liquid crystal material that increases a conjugate property through introducing —C≡C— to the molecular framework or the like is avoided, or by decreasing a rate of such material in the composition, and the like.

Major Effects of Embodiment

As described thus far, in the blue-color liquid crystal panel 100B out of the plurality of liquid crystal panels 100 used in the projection type display apparatuses 110, 1000 and the optical unit 200 of the embodiment, an integral value obtained by integrating absorbance of the liquid crystal layer 50 in a wavelength range $\lambda_{300\text{-}350}$ of 300 nm to 350 nm is smaller in comparison with those of the other liquid crystal panels (red-color liquid crystal panel 100R and green-color liquid crystal panel 100G). In addition, the absorption end on the long wavelength side of the liquid crystal layer 50 of the blue-color liquid crystal panel 100B is positioned on the short wavelength side in comparison with the liquid crystal layers 50 of the red-color liquid crystal panel 100R and green-color liquid crystal panel 100G. In other words, the light transmission rate of the blue-color liquid crystal panel 100B is larger when a beam of light of short wavelength region is incident in comparison with the red-color liquid crystal panel 100R and green-color liquid crystal panel 100G. Accordingly, although excitation in a material used in the liquid crystal layer 50 is smaller in the blue-color liquid crystal panel 100B even if a beam of light of short wavelength region is incident in comparison with the red-color liquid crystal panel 100R and green-color liquid crystal panel 100G, deterioration of the liquid crystal layer 50 is unlikely to occur. Therefore, it can be said that light resistance of the blue-color liquid crystal 100B is superior to that of the red-color liquid crystal panel 100R and green-color liquid crystal panel 100G. On the other hand, since beams of light that enter the red-color liquid crystal panel 100R and the green-color liquid crystal panel 100G have a longer wavelength than the beam of light that enters the blue-color liquid crystal panel 100B, the liquid crystal layers 50 are unlikely to be deteriorated. Therefore, in the projection type display apparatuses 110, 1000 and the optical unit 200 of the embodiment, deterioration of the liquid crystal layer 50 is unlikely to occur in any of the liquid crystal panels 100, thereby making it possible to project and display images with high quality for a longer period of time. In particular, because deterioration of the liquid crystal layer 50 is likely to occur as the intensity of a beam of incident light on the liquid crystal panel 100 is higher, the configuration of the embodiment is effective when the intensity of the beam of incident light on the liquid crystal panel 100 is set to be high.

Further, in this embodiment, the same liquid crystal layer 50 is used in the red-color liquid crystal panel 100R and green-color liquid crystal panel 100G because the liquid crystal layer 50 is unlikely to be deteriorated in those panels. Accordingly, the same liquid crystal panel 100 can be used for the red-color liquid crystal panel 100R and green-color liquid crystal panel 100G, thereby making it possible to simplify the configuration of the apparatus.

Refractive Index Anisotropy of Liquid Crystal Layer 50

In the aforementioned embodiment, although a liquid crystal material that is less likely to absorb a beam of light of short wavelength region is used in the blue-color liquid crystal panel 100B in comparison with the red-color liquid crystal panel 100R and green-color liquid crystal panel 100G, a liquid crystal material whose refractive index anisotropy Δn is smaller may also be used in the blue-color liquid crystal panel 100B in comparison with the red-color liquid crystal panel 100R and green-color liquid crystal panel 100G. The reason for this is as follows. When a liquid crystal material whose absorption end on the long wavelength side is positioned on the short wavelength side in various kinds of ultraviolet absorption spectra is selected for the blue-color liquid crystal panel 100B, it has been found that light resistance of the blue-color liquid crystal panel 100B can be further enhanced by making the refractive index anisotropy Δn of the liquid crystal material used in the blue-color liquid crystal panel 100B smaller than that of the liquid crystal material used in the red-color liquid crystal panel 100R and green-color liquid crystal panel 100G. For example, a liquid crystal material whose refractive index anisotropy Δn is approximately 0.10 is used in the blue-color liquid crystal panel 100B, whereas a liquid crystal material whose refractive index anisotropy Δn is approximately 0.12 is used in the red-color liquid crystal panel 100R and the green-color liquid crystal panel 100G. Therefore, if a liquid crystal material which is less likely to absorb a beam of light of short wavelength region and whose refractive index anisotropy Δn is smaller is used in the blue-color liquid crystal panel 100B in comparison with the red-color liquid crystal panel 100R and green-color liquid crystal panel 100G, the light resistance of the blue-color liquid crystal panel 100B can be further enhanced. As such liquid crystal material with a smaller refractive index anisotropy Δn, a single material selected from among a liquid crystal material of biphenyl, a liquid crystal material of phenylcyclohexane, a liquid crystal material of cyclohexane, a liquid crystal material of phenyl pyrimidine, a liquid crystal material of ester, a liquid crystal material of dioxane and so on, or a material made by blending some of these liquid crystal materials may be preferably adopted.

Other Embodiments

The projection type display apparatus may be configured such that an LED light source or the like which emits individual beams of color light is used as a light source unit and the individual beams of color light emitted from the LED light source are supplied respectively to each individual liquid crystal panel.

In the aforementioned embodiments, an example in which a total of three liquid crystal panels 100 of red-color, green-color and blue-color are used is described. However, the invention may be applied to an apparatus in which two liquid crystal panels 100 that deal with different colors are used, an apparatus in which equal to or more than four liquid crystal panels 100 are used, and so on.

In the aforementioned embodiments, although the same liquid crystal material is used in the other liquid crystal panels 100, the invention is not limited thereto and different liquid crystal materials may be used in the other liquid crystal panels 100 respectively.

The entire disclosure of Japanese Patent Application No. 2011-126155, filed Jun. 6, 2011 and 2012-37107, filed Feb. 23, 2012 are expressly incorporated by reference herein.

What is claimed is:

1. A projection type display apparatus comprising:
a light source;
a plurality of liquid crystal panels to each of which a beam of light of a different wavelength region is supplied from the light source;
a light-combining optical system that combines beams of light emitted from the plurality of liquid crystal panels and emits the combined beam of light; and
a projection optical system that projects the beam of light combined by the light-combining optical system,
wherein the plurality of liquid crystal panels include two or more liquid crystal panels serving as other liquid crystal panels in which the same liquid crystal material, containing liquid crystal molecules, is used in liquid crystal layers thereof,
a liquid crystal material, containing liquid crystal molecules, different from the liquid crystal material used in the other liquid crystal panels is used in a liquid crystal layer of a liquid crystal panel for a short wavelength region, and
in the liquid crystal panel for the short wavelength region to which a beam of light of the shortest wavelength region is supplied among the plurality of liquid crystal panels, an integral value obtained by integrating absorbance of the liquid crystal layer of the liquid crystal panel for the short wavelength region in a wavelength range from 300 nm to 350 nm is smaller than those in any of the other liquid crystal panels.

2. The projection type display apparatus according to claim 1,
wherein, on an ultraviolet absorption spectrum, the liquid crystal panel for the short wavelength region has an absorption end point positioned at a shorter wavelength than an absorption end point for the other liquid crystal panels.

3. A projection type display apparatus comprising:
a light source;
a plurality of liquid crystal panels to each of which a beam of light of a different wavelength region is supplied from the light source;
a light-combining optical system that combines beams of light emitted from the plurality of liquid crystal panels and emits the combined beam of light; and
a projection optical system that projects the beam of light combined by the light-combining optical system,
wherein the plurality of liquid crystal panels include two or more liquid crystal panels serving as other liquid crystal panels in which the same liquid crystal material, containing liquid crystal molecules, is used in liquid crystal layers thereof,
a liquid crystal material, containing liquid crystal molecules, different from the liquid crystal material used in the other liquid crystal panels is used in a liquid crystal layer of a liquid crystal panel for a short wavelength region, and
on an ultraviolet absorption spectrum, the liquid crystal panel for the short wavelength region has an absorption end point positioned at a shorter wavelength than an absorption end point for other liquid crystal panels.

4. The projection type display apparatus according to claim 1,
wherein refraction index anisotropy of the liquid crystal layer is smaller in the liquid crystal panel for the short wavelength region than in the other liquid crystal panels.

5. The projection type display apparatus according to claim 1,
wherein the plurality of liquid crystal panels include a red-color liquid crystal panel to which a beam of red light is supplied, a green-color liquid crystal panel to which a beam of green light is supplied, and a blue-color liquid crystal panel to which a beam of blue light is supplied,
the blue-color liquid crystal panel is the liquid crystal panel for the short wavelength region, and
the red-color liquid crystal panel and the green-color liquid crystal panel are the other liquid crystal panels.

6. An optical unit comprising:
a plurality of liquid crystal panels to each of which a beam of light of a different wavelength region is supplied; and
a light-combining optical system that combines beams of light emitted from the plurality of liquid crystal panels and emits the combined beam of light,
wherein the plurality of liquid crystal panels include two or more liquid crystal panels serving as other liquid crystal panels in which the same liquid crystal material, containing liquid crystal molecules, is used in liquid crystal layers thereof,
a liquid crystal material, containing liquid crystal molecules, different from the liquid crystal material used in the other liquid crystal panels is used in a liquid crystal layer of a liquid crystal panel for a short wavelength region, and in the liquid crystal panel for the short wavelength region to which a beam of light of the shortest wavelength region is supplied among the plurality of liquid crystal panels, an integral value obtained by integrating absorbance of the liquid crystal layer of the liquid crystal panel for the short wavelength region in a wavelength range from 300 nm to 350 nm is smaller than those in any of the other liquid crystal panels.

7. An optical unit comprising:

a plurality of liquid crystal panels to each of which a beam of light of a different wavelength region is supplied; and a light-combining optical system that combines beams of light emitted from the plurality of liquid crystal panels and emits the combined beam of light, wherein the plurality of liquid crystal panels include two or more liquid crystal panels serving as other liquid crystal panels in which the same liquid crystal material, containing liquid crystal molecules, is used in liquid crystal layers thereof, a liquid crystal material, containing liquid crystal molecules, different from the liquid crystal material used in the other liquid crystal panels is used in a liquid crystal layer of a liquid crystal panel for a short wavelength region, and on an ultraviolet absorption spectrum, the liquid crystal panel for the short wavelength region has an absorption end point positioned at a shorter wavelength than an absorption end point for other liquid crystal panels.

* * * * *